United States Patent
Shim (10) Patent No.: US 8,121,616 B2
(45) Date of Patent: Feb. 21, 2012

(54) SET INITIATED AREA EVENT TRIGGERED POSITIONING METHOD IN MOBILE COMMUNICATION SYSTEM

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/571,284

(22) Filed: Sep. 30, 2009

(65) Prior Publication Data

US 2010/0093326 A1   Apr. 15, 2010

Related U.S. Application Data

(63) Continuation of application No. 11/783,213, filed on Apr. 6, 2007.

(60) Provisional application No. 60/789,609, filed on Apr. 6, 2006, provisional application No. 60/795,184, filed on Apr. 27, 2006, provisional application No. 60/810,631, filed on Jun. 5, 2006, provisional application No. 60/836,938, filed on Aug. 11, 2006.

(30) Foreign Application Priority Data

Feb. 5, 2007  (KR) .................................. 2007-11577

(51) Int. Cl.
*H04W 24/00* (2009.01)
(52) U.S. Cl. ................ 455/456.1; 340/539.13; 455/418; 455/456.6
(58) Field of Classification Search ............... 455/456.1, 455/418, 456.6; 340/539.13
See application file for complete search history.

(56) References Cited

U.S. PATENT DOCUMENTS

| | | | |
|---|---|---|---|
| 7,149,504 B1 | 12/2006 | Weaver et al. |
| 7,254,388 B2 | 8/2007 | Nam et al. |
| 7,593,722 B2 | 9/2009 | Jagadeesan et al. |
| 7,627,322 B1 | 12/2009 | Bosik et al. |
| 7,627,332 B2 | 12/2009 | Shim |
| 7,706,813 B2 | 4/2010 | Shim |
| 7,778,639 B2 | 8/2010 | Shim |
| 2002/0072369 A1 | 6/2002 | Sasada et al. |
| 2004/0157620 A1 | 8/2004 | Nyu |

(Continued)

FOREIGN PATENT DOCUMENTS

KR   10-2005-0101112 A   10/2005

(Continued)

OTHER PUBLICATIONS

Kim, XP-002552113, Open Mobile Alliance, OMA-LOC-2004-0185-CR-Separate_Periodic_Location_Request, Jun. 13, 2004, Retrieved from the Internet: URL: <http://member.openmobilealliance.org/ftp/Public_documents/LOC/2004/OMA-LOC-2004-0185-CR-Separate_Periodic_Location_Request.zip.>, Retrieved on Oct. 22, 2009, pp. 1-5.

(Continued)

Primary Examiner — Charles Appiah
Assistant Examiner — Alexander Yi
(74) Attorney, Agent, or Firm — Birch, Stewart, Kolasch & Birch, LLP (57) ABSTRACT

A SET-initiated area event triggered positioning method in a session-based service system is disclosed. The method is variously performed according to a proxy mode or a non-proxy mode, and further according to which SLP (SUPL location platform) has a positioning procedure.

10 Claims, 4 Drawing Sheets

U.S. PATENT DOCUMENTS

| | | | |
|---|---|---|---|
| 2004/0203885 | A1 | 10/2004 | Quaid |
| 2004/0242238 | A1 | 12/2004 | Wang et al. |
| 2005/0043038 | A1 | 2/2005 | Maanoja et al. |
| 2005/0099972 | A1 | 5/2005 | Motegi et al. |
| 2005/0118999 | A1 | 6/2005 | Zhu |
| 2005/0136942 | A1 | 6/2005 | Timiri et al. |
| 2005/0250516 | A1 | 11/2005 | Shim |
| 2006/0003775 | A1 | 1/2006 | Bull et al. |
| 2006/0014531 | A1* | 1/2006 | Nam et al. .......... 455/418 |
| 2006/0030333 | A1 | 2/2006 | Ward et al. |
| 2006/0063536 | A1 | 3/2006 | Kim et al. |
| 2006/0276167 | A1 | 12/2006 | Burroughs |
| 2007/0096981 | A1 | 5/2007 | Abraham |
| 2007/0182547 | A1* | 8/2007 | Wachter et al. .......... 340/539.13 |
| 2007/0281670 | A1 | 12/2007 | Shim |
| 2007/0286212 | A1 | 12/2007 | Kim et al. |
| 2010/0167757 | A1 | 7/2010 | Shim |
| 2010/0167759 | A1 | 7/2010 | Shim |

FOREIGN PATENT DOCUMENTS

| | | |
|---|---|---|
| KR | 10-2006-0024305 A | 3/2006 |
| KR | 10-2006-0025973 A | 3/2006 |
| RU | 2 359 282 C2 | 6/2009 |
| WO | WO-03/045101 A1 | 5/2003 |
| WO | WO 2007/114635 A1 | 10/2007 |

OTHER PUBLICATIONS

Wang, XP-002552114, Open Mobile Alliance, OMA-LOC-2004-136R032-CR_SUPL_AD_Message_Periodic Call Flows, Jun. 12, 2004, Retrieved from the Internet: URL: <http://member.openmobilealliance.org/ftp/Public_documents/LOC/2004/0136R03-SUPL_Periodic_Call_Flows.zip>, Retrieved on Oct. 22, 2009, pp. 1-7.

Open Mobile Alliance: "Secure User Plane Location Architecture," Draft Version 1.0, Jun. 28, 2005, pp. 1-80.

Guojun et al., "About Optimization Area Event Handing Proxy Mode, " OMA-LOC-2005-0153R03-CR-SUPL-2.0-TS-About-Optimization-Area-Event-Handling-Proxy-Mode, Jun. 2, 2006, pp. 1-9, XP002566950, Retrieved from the Internet on Feb. 4, 2010.

QUALCOMM, "Addition of Periodic Location Procedures," 3GPP TSG SA WG2, XX, XX, No. S2-051536, Jun. 27, 2005, pp. 1-26, XP002410621.

Shim et al., "Notification based on current location—Non proxy mode," OMA-LOC-2006-0076R01-CR-SUPL_2_0_Optimization-Area-Event-Handling-Proxy-Mode, Mar. 27, 2006, pp. 1-6, XP002566834, Retrieved from the Internet on Feb. 4, 2010.

Watcher et al., "SUPL 1.0 AD Area Event Triggered Services for SI Proxy," OMA-LOC-2006-0013R01-CR-2_0-AD-Area-Event-Triggered-Services-for-NI-Proxy, Feb. 2, 2006, pp. 1-12, XP002566835, Retrieved from the Internet on Feb. 4, 2010.

Watcher et al., "SUPL 2.0 AD Area Event Triffered Services for SI Proxy," OMA-LOC-2006-0014R01-SUPL-2_0-AD-Area-Event-Triggered-Services-for-SI-Proxy, Feb. 2, 2006, pp. 1-10, XP002566949, Retrieved from the Internet on Feb. 4, 2010.

Kim et al., "OMA-LOC-2004-0144-CR-Deferred_Location_Request_for_Area_Event," May 17, 2004, pp. 1-5, XP002566434, <URL:http://member.openmobilealliance.org/ftp/Public_documents/LOC/2004/>, [Retrieved Feb. 2, 2010].

Kim, "OMA-LOC-2005_0365-SET_Init_NonRoaming-MonProxy_Deferred_Service," OMA-LOC WG, Aug. 12, 2005, pp. 1-4, XP002566436, <URL:http://member.openmobilealliance.org/ftp/Public_documents/LOC/2005/> [Retrieved on Feb. 2, 2010].

Kim, "OMA-LOC-Network Initiated Deferred Service-NonRoaming-NonProxy," OMA-LOC WG, Aug. 12, 2005, pp. 1-5, XP002566437, <http://member.openmobilealliance.org/ftp/Public_documents/LOC/2005/> [Retrieved on Feb. 2, 2010].

Shim, "OMA-LOC-2004-0148R01-CR-SUPL_AD_SET_Initiated_Deferred_Message_Flows," OMA LOC WG, Jun. 15, 2004, pp. 1-3, XP002566435, <URL:http://member.openmobilealliance.org/ftp/Public_documents/LOC/2004> [Retrieved on Feb. 2, 2010].

Wuk et al., "OMA-LOC-2004-0162RO2-CR-Combined_Deferred_Location_Request," OMA-LOC WG, Jun. 13, 2004, pp. 1-5, XP002566433, <URL:http://member.openmobilealliance.org/ftp/Public_documents/LOC/2004> [Retrieved on Feb. 2, 2010].

TSG SA WG2 (S2-030985): "Updated and revised LCS2 Work Item Description", 3GPP Draft; SP-030127, 3rd Generation Partnership Project (3GPP), vol. TSG SA, no. Birmingham, UK; Mar. 13, 2003, XP050199061 [retrieved on Mar. 13, 2003].

OMA, "Secure User Plane Location Service Stage 2 Specification Draft Version 1.0-19 Dec. 2003", Open Mobile Alliance OMA-LOC-SUPL-Spec-Stage-2-V1_0-20031219-D, Open Mobile Alliance Ltd., 2000.

Wachter et al., ( "SUPL 2.0 AD Area Event Triggered Services for Doc # SI Proxy"), OMA-LOC-2006-0014R01-SUPL 2.0 AD Area Event Triggered Services for SI Proxy, Change Request, 2006 Open Mobile Alliance Ltd., pp. 1-11, Feb. 2, 2006, XP002566949.

Xu et al., "About Optimization Area Event Handling Proxy Mode", Doc #, OMA-LOC-2006-0153R03-CR-SUPL-2_0-TS-About-Optimization-Area-Event-Handling-Proxy-mode, Change Request, 2006 Open Mobile Alliance Ltd., pp. 1-9, Jun. 2, 2006, XP002566950.

OMA, "Secure User Plane Location Architecture Draft Version 2.0-27 Jan. 2006," Open Mobile Alliance, OMA-AD-SUPL-V2_0-2006104-D, Open Mobile Alliance Ltd., 2006, pp. 1-19.

Open Mobile Alliance, "Secure User Plane Location Architecture", OMA-AD-SUPL-V2_0-20060307-D, Draft Version 2.0, pp. 1-171, Mar. 7, 2006.

Shim et al., "Optimization of Area Event Handling", OMA-LOC-2006-0028-IC-SUPL-2_0-Optimization-Area_Event-Handling-Proxy-Mode Input Contribution, pp. 1-5, Jan. 27, 2006.

* cited by examiner

SET INITIATED AREA EVENT TRIGGERED POSITIONING METHOD IN MOBILE COMMUNICATION SYSTEM

This application is a Continuation Application of co-pending U.S. application Ser. No. 11/783,213 filed on Apr. 6, 2007 and for which priority is claimed under 35 U.S.C. §120, which claims priority to U.S. Provisional Application No(s). 60/789,609; 60/795,184; 60/810,631 and 60/836,938 filed on Apr. 6, 2006; Apr. 27, 2006; Jun. 5, 2006 and Aug. 11, 2006; respectively and Korean Patent Application No. 10-2007-0011577 filed on Feb. 5, 2007 in Republic of Korea respectively. The entire contents of these applications are herein fully incorporated by reference.

BACKGROUND OF THE INVENTION

1. Field of the Invention

The present invention relates to a mobile communication system, and more particularly, to a SET-initiated area event triggered positioning method in a mobile communication system capable of initiating an area event triggered session and performing an area event triggered positioning procedure by a SET in a session-based service system.

2. Description of the Background Art

In a mobile communication system, a function group for calculating a position estimate of a mobile terminal is provided at a mobile communication network, and a location service for informing the position estimate to an entity periodically or according to a user's request is provided. The network regarding the location service has various configurations according to inner configurations such as 3GPP or 3GPP2.

A method for calculating a position estimate of a terminal in the mobile communication system includes a cell-id method for informing an ID of a cell to which a terminal belongs, a triangulation method for calculating a position estimate of a terminal by using a triangulation after measuring wave sending time from the terminal to each base station, a GPS using method, etc.

In order to provide location service to a user by using the above methods, signaling and location information have to be sufficiently sent between the terminal and a location server. Accordingly, positioning technologies for providing location service, i.e., a location service based on a position estimate of the terminal is being spread. The position technologies may be provided through a user plane and a control plane. As a representative of the position technologies through the user plane, a secure user plane location (SUPL) method has been well known.

The SUPL method is efficient in sending location information necessary to calculate a position estimate of a base station, in which location assistance information such as a GPS assistance is sent, and a user plane data bearer is used to carry protocols regarding the positioning technology between the terminal and a network.

An SUPL network regarding a location service in a positioning system includes an SUPL Agent, an SUPL Location Platform (SLP), an SUPL Enabled Terminal (SET), etc. The SUPL Agent indicates a logic service access point using substantially measured location information, and the SLP indicates an SUPL service access point inside a network for accessing network resources so as to obtain location information.

The SET is a device communicating with an SUPL network using an SUPL interface (i.e., a user terminal of UMTS, a mobile station of GSM, a laptop computer having an IS-95 MS function or a SET function, or a PDA). The SET may be various mobile terminals connected to one another through a WLAN.

The SET supports procedures defined in an SUPL by being connected to a network through a user plane bearer. Herein, a network to which a user has been originally registered is defined as a Home Network, and a network of the user's moving area rather than the Home Network is defined as a Visited Network. An SLP of the Home Network is defined as an Home-SLP, and an SLP of the Visited Network is defined as a V-SLP (Visited-SLP). When an SUPL procedure is started on the network, an SLP to which an external client is firstly connected is defined as an R-SLP (Requesting SLP). The R-SLP is a logical entity, and may be or may not be same as the H-SLP. A SET having an object to verify a current position estimate is defined as a target SET.

The SLP of the network consists of an SPC (SUPL Positioning Center) for calculating a position estimate, and an SLC (SUPL Location Center) for performing roaming, resource management, etc. The SET may calculate location information by indirectly communicating with the SPC via the SLC (Proxy mode), or may calculate location information by directly communicating with the SPC (Non-proxy mode).

In the related art, even if an SUPL-based immediate positioning method is disclosed, a SET-initiated area event triggered positioning method in an SUPL-based system is not disclosed

SUMMARY OF THE INVENTION

Therefore, an object of the present invention is to provide a SET-initiated area event triggered positioning method in an SUPL system.

To achieve these and other advantages and in accordance with the purpose of the present invention, as embodied and broadly described herein, there is provided a SET-initiated area event triggered positioning method in a mobile communication system, comprising: receiving a SESSION START message to start a trigger session from a roaming SET by a first server; requesting and obtaining area ids of a specific area for an area event triggered positioning from a second server by the first server; sending a SESSION RESPONSE message to the SET; receiving a POS INIT message from the SET, and sending it to the second server; and receiving a calculated position estimate of the SET from the second server, and sending it to the SET; and receiving a SESSION END message from the SET, and sending it to the second server.

The first server sends the area ids obtained from the second server to the SET through the SESSION RESPONSE message. The first server is an H-SLP, and the second server is a V-SLP.

According to a second embodiment of the present invention, there is provided a SET-initiated area event triggered positioning method in a mobile communication system, comprising: receiving a SESSION START message to start a trigger session from a roaming SET by a first server; requesting and obtaining area ids of a specific area for an area event triggered positioning from a second server by the first server; sending a SESSION RESPONSE message to the SET; performing a positioning procedure with the SET by the first server, and sending a calculated position estimate of the SET to the SET; and receiving a SESSION END message from the SET.

The first server sends the area ids obtained from the second server to the SET through the SESSION RESPONSE message. The first server uses a proxy mode, and has a positioning function to calculate a position estimate of the SET.

According to a third embodiment of the present invention, there is provided a SET-initiated area event triggered positioning method in a mobile communication system, comprising: sending a SESSION START message to start a trigger session to a first server by a SET; receiving a SESSION RESPONSE message from the first server; sending a POS INIT message to the first server; receiving a calculated position estimate of the SET from the first server; checking if an event trigger condition has been met by comparing the calculated position estimate with position values of an event area; and if the event trigger condition has been met, providing the calculated position estimate by the SET to its agent.

The SET receives the area ids of the event area from the first server through the SESSION RESPONSE message. The area ids are obtained from the second server by the first server, and the first serer uses a proxy mode.

According to a fourth embodiment of the present invention, there is provided a SET-initiated area event triggered positioning method in a mobile communication system, comprising: receiving a SESSION START message to start a trigger session from a roaming SET by a first server; requesting and obtaining area ids of a specific area for an area event triggered positioning from a third server via a second server by the first server; sending a SESSION RESPONSE message including at least an address of the third server and parameters about a security session establishment to the SET; and receiving a SESSION END message from the third server by the first server.

The first server sends the obtained area ids to the SET through the SESSION RESPONSE message. The first server uses a non-proxy mode, and the third server performs a positioning function. Herein, the first server is an H-SLC, the second server is a V-SLC, and the third server is a V-SPC.

According to a fifth embodiment of the present invention, there is provided a SET-initiated area event triggered positioning method in a mobile communication system, comprising: sending a SESSION START message to start a trigger session to a first server by a SET; receiving from the first server a SESSION RESPONSE message including at least parameters about a security session and an address of a second server; sending a POS INIT message to the second server by the SET; performing a positioning procedure by the SET by establishing a security session with the second server by using the parameters; receiving a calculated position estimate of the SET from the second server; checking by the SET if an area event trigger condition has been met by comparing the calculated position estimate with position values of an event area; and if the area event trigger condition is met, providing the calculated position estimate by the SET to its agent.

The SET receives the area ids covering the event area from the first server through the SESSION RESPONSE message.

The first server may provide the area ids obtained from the second server to the SET through a third server. Herein, the first server is an H-SLC, the second server is a V-SPC, and the third server is a V-SLC.

The first server may provide the area ids obtained from the third server to the SET. Herein, the first server is an H-SLC, the second server is a H-SPC, and the third server is a V-SLC.

According to a sixth embodiment of the present invention, there is provided a SET-initiated area event triggered positioning method in a mobile communication system, comprising: receiving a SESSION START message to start a trigger session from a SET by a first server; requesting and obtaining area ids for an event area from a second server by the first server; sending a SESSION RESPONSE message including at least parameters about a security session establishment and an address of the third server to the SET by the first server; and receiving a SESSION END message from the SET through the third server by the first server.

The first server sends the obtained area ids to the SET through the SESSION RESPONSE message. Herein, the first server is an H-SLC, the second server is a V-SLC, and the third server is an H-SPC.

According to an embodiment, the invention provides a SUPL Enabled Terminal (SET)-initiated area event triggered positioning method in a mobile communication system having a home network and a visited network that support roaming of the SET, the method comprising: receiving, by a first server, a SUPL TRIGGERED START message from a SET to start a trigger session, the SUPL TRIGGERED START message including a session-id, SET capabilities, a trigger type indicator, a location identifier (lid), and trigger parameters; verifying, by the first server, whether the SET is roaming; sending, by the first server, a RLP SSRLIR message that includes the SUPL TRIGGERED START message to a second server after the SET is verified to be roaming; receiving, by the first server, a RLP message from the second server, the RLP message including area ids to a specific area in the trigger parameters; sending, by the first server, in response to the SUPL TRIGGERED START message, a SUPL TRIGGERED RESPONSE message to the SET, the SUPL TRIGGERED RESPONSE message including a session-id, a positioning method, and the area ids corresponding to the specific area; receiving, by a third server from the SET, a POS INIT message to allow the SET to start a positioning session with the third server when a comparison of a current cell-id and one of the area ids satisfy a positioning session start condition, wherein the POS INIT message includes a session-id, lid, and SET capabilities, wherein the first server and the third server are part of a H-SLP (Home SUPL Location Platform) of the home network; performing the positioning session by the third server with the SET by exchanging positioning messages to obtain a positioning result; sending, by the third server to the SET, a SUPL REPORT message that includes the positioning result; and receiving, by the third server from the SET, a SUPL END message.

According to an embodiment, the invention provides a SUPL Enabled Terminal (SET)-initiated area event triggered positioning method in a mobile communication system having a home network and a visited network that support roaming of the SET, the method comprising: sending, to a first server, a SUPL TRIGGERED START message to start a trigger session, the SUPL TRIGGERED START message including a session-id, SET capabilities, a trigger type indicator, a location identifier (lid), and trigger parameters; receiving, from the first server, in response to the SUPL TRIGGERED START message, a SUPL TRIGGERED RESPONSE message, the SUPL TRIGGERED RESPONSE message including a session-id, a positioning method, and the area ids corresponding to the specific area; sending, to another server, a POS INIT message to allow the SET to start a positioning session with said another server when a comparison of a current cell-id and one of area ids satisfy a positioning session start condition, wherein the POS INIT message includes a session-id, lid, and SET capabilities, wherein the first server and said another server are part of a H-SLP (Home SUPL Location Platform) of the home network; performing the positioning session with said another server by exchanging positioning messages with said another server to obtain a positioning result; receiving, from said another server, a SUPL REPORT message that includes the positioning result; and sending, to said another server, a SUPL END message.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, preferred embodiments of the present invention will be explained.

The present invention is implemented in an SUPL network. However, the present invention may be applied to a wireless communications system operated in any other standard.

The present invention provides a SET-initiated area event triggered positioning method in a mobile communication system, in which a positioning procedure for a roaming SET on a visited network (i.e., entering to a specific area, leaving the specific area or staying at the specific area) is performed in a session-based positioning system when the SET and a server manage trigger information for positioning.

In the area event triggered positioning method according to the present invention, a home network requests area ids of a specific area for an area event triggered positioning to a visited network, obtains the area ids from the visited network and provides the obtained area ids to a target SET (a roaming SET).

In the area event triggered positioning method according to the present invention, a positioning procedure for the SET is not always performed but is performed only when the SET is positioned near a specific area ("the specific area" can be referred as a requested area or an event area). The SET determines whether to start a positioning procedure according to whether a positioning starting condition has been met. The fact that a positioning starting condition has been met indicates that the SET has been approached to an area specified in the area event trigger condition information (a specific area, a requested area, or an event area).

If a calculated position estimate of the SET belongs to the event area (i.e., if the area event trigger condition has been met), the SET judges that an area event has occurred. Then, the SET sends the calculated position estimate to a client (a terminal, or an agent included in a network).

An area event occurrence indicates that the SET enters into the event area, leaves the event area, or stays at the specific area.

A location service provided from an SUPL-based positioning system is divided into a network-initiated case and a SET-initiated case.

The SUPL-based location service is divided into a proxy mode and a non-proxy mode. According to the proxy mode, a positioning procedure between a location server and a SET is performed via an H-SLP of a home network operated as a proxy. According to the non-proxy mode, the positioning procedure between the location server and the SET is directly performed not via the H-SLP (or H-SLC) of a home network operated as a non-proxy. The location server may be the H-SLP or a V-SLP.

The SUPL-based location service may be classified according to whether a positioning procedure for the SET is performed by the H-SLP (or the H-SPC) or the V-SLP (or the V-SPC).

In the present invention, four preferred embodiments will be explained according to whether a proxy mode has been applied to a SET-initiated case, or according to whether a location server belongs to an SLP on which network.

Hereinafter, a SET-Initiated area event triggered positioning method according to a first embodiment of the present invention will be explained.

Figure 1:
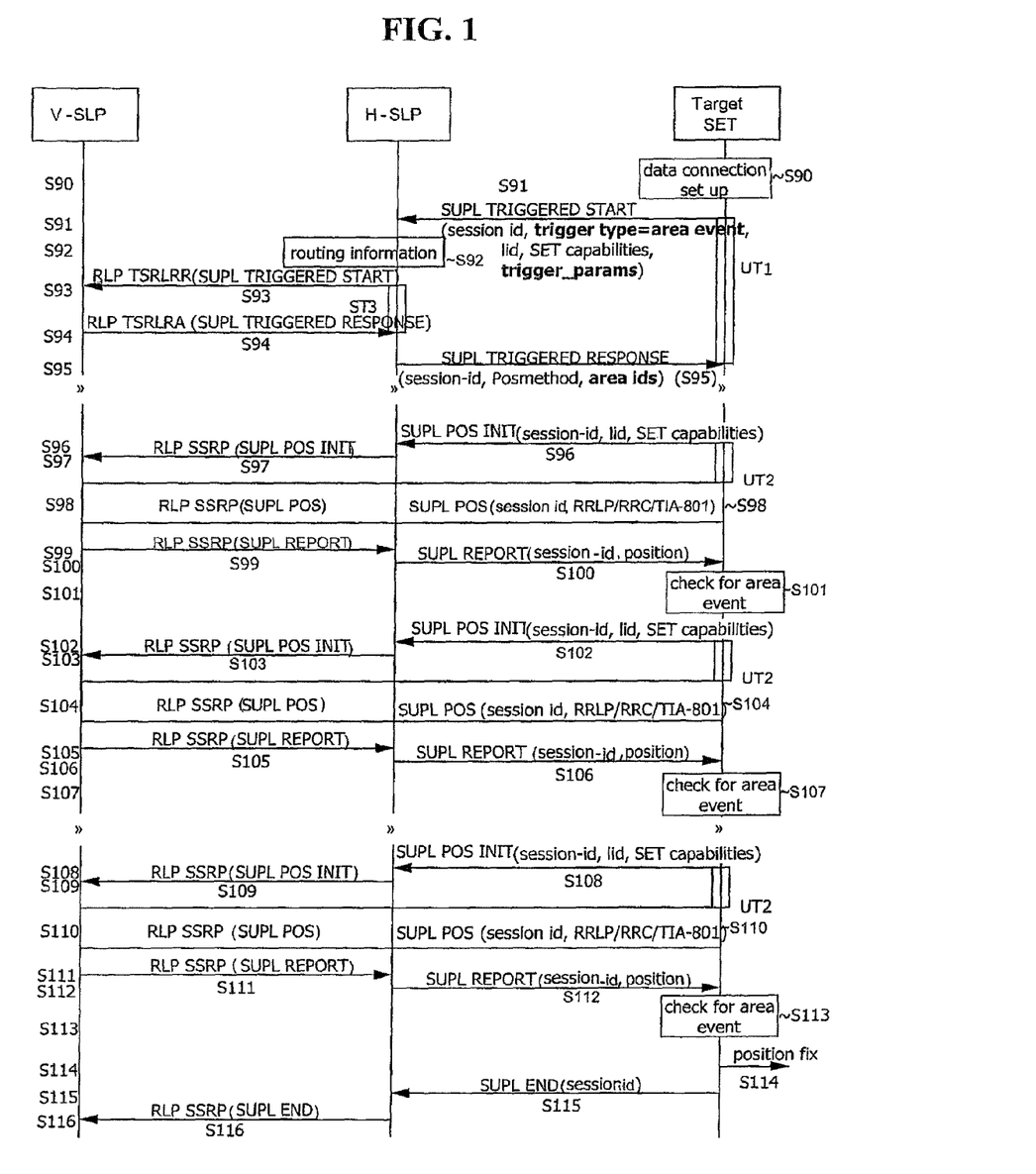
FIG. 1 is a view showing a SET-initiated area event triggered positioning method according to a first embodiment of the present invention.

FIG. 1 is a view showing a SET-initiated area event triggered positioning method according to a first embodiment of the present invention, in which a roaming case, a SET-initiated case, a V-SLP positioning case and a proxy mode are implemented. Referring to FIG. 1, the SET is a roaming SET, the SET initiates an area event triggered service, the V-SLP performs a positioning function (i.e., is operated as a location server), and the H-SLP uses a proxy mode.

As shown in FIG. 1, the SUPL Agent in the SET receives a request for an area event triggered service from an application running on the SET. The SET attaches itself to a packet data network if it is not already attached thereto, or establishes a circuit switched data connection (S90).

The SUPL Agent in the SET uses a default address provisioned by a Home Network to establish a secure IP connection to the H-SLC, and sends an SUPL TRIGGERED START message to start a positioning session with the H-SLP (S91).

The SUPL TRIGGERED START message contains at least a session-id, SET capabilities, a trigger type indicator (e.g., an area event), a location identifier (lid), SET capabilities, and trigger parameters.

As the SET sends an SUPL INIT message including the trigger type indicator to the H-SLP, the H-SLP recognizes that the area event trigger positioning is currently requested.

The lid indicates an id of a cell to which the SET currently belongs.

The trigger parameters represent an area event triggered parameters.

The trigger parameters may comprise trigger condition information, i.e., a change-area type for an area event triggered positioning (entering to a specific area, leaving the specific area or staying at the specific area) and the specific area (name or position values of the specific area).

The H-SLP having received the SUPL TRIGGERED START message verifies whether the SET is currently SUPL roaming based on routing information (S92). If the SET is SUPL roaming, the H-SLP determines a V-SLP based on a lid contained in the SUPL TRIGGERED START message. The H-SLP sends a roaming location protocol (RLP) triggered standard roaming location reporting request (TSRLRR) message including the SUPL TRIGGERED START message to the V-SLP so as to inform the determined V-SLP that the SET has initialized an SUPL positioning procedure.

The H-SLP has to include an area ids request indicator to the SUPL TRIGGERED START message (S93).

The H-SLP requests an area id for an area event trigger session from the V-SLP by sending the RLP TSRLRR message to the V-SLP.

Once receiving the RLP TSRLRR message, the V-SLP determines a posmethod (positioning method) for an area event triggered session from a SET capability included in the RLP TSRLRR message. Then, the V-SLP sends an RLP TSRLRA (triggered standard roaming location reporting answer) message to the H-SLP, which informs the H-SLP that an area event triggered session has been prepared.

The V-SLP also checks the area ids request indicator included in the RLP TSRLRR message. If area ids are requested by the H-SLP, the V-SLP includes area ids corresponding to the specific area for an event triggered session in the SUPL TRIGGERED RESPONSE message, and then sends the RLP TSRLRA message including the SUPL TRIGGERED RESPONSE message to the H-SLP (S94).

The H-SLP forwards the received SUPL TRIGGERED RESPONSE message to the SET (S95). The SUPL TRIGGERED RESPONSE message should not include an address of the H-SLP so as to inform the SET that a new connection shall not be established.

The SUPL TRIGGERED REPONSE message includes a posmethod. The SUPL TRIGGERED RESPONSE message may also include area ids for an area event triggered session. Preferably, the area ids represent ids of cells that belong to an area that has been requested to be positioned by the SUPL Agent, mobile country codes (MCC), mobile network codes (MNC) or location area codes (LAC), or a primary scrambling code number. In case of a WCDMA, the area id represents a primary scrambling code number.

Then, the SET may release the IP connection with the H-SLP.

Once the area id or the area ids are received through the SUPL TRIGGER RESPONSE message, the SET checks if a positioning session start condition has been met.

The checking may be performed by comparing a current area id of the SET with area ids received from the H-SLP.

That is, the SET compares the current area id with the received area ids, and checks if there exists a consistent area id therebetween.

If the change_area type in the trigger parameter (trigger_params) indicates that the SET is verified to enter to the specific area or to stay at the specific area, the SET starts a positioning session when at least one of the received area ids is consistent with the current area id. When the at least one of the received area ids is consistent with the current area id, the SET judges that the positioning session start condition has been met.

On the contrary, if the change_area type indicates that the SET is verified to leave the specific area, the SET judges that the positioning session start condition has been met when any one of the received area ids is not consistent with the current area id.

The comparison of the current area id with the received area ids or the area event trigger in the SET indicates that a position fix has to be calculated. That is, the SET has to check whether itself has approached to the specific area requested by the SUPL Agent by verifying its coarse position estimate. Accordingly, a position estimate (or a position fix) of the SET is not always calculated, but is calculated only when it is judged that the SET has approached to the specific area requested by the SUPL Agent.

If it is judged that the positioning session start condition has been met by comparing the area ids with the current area id, the SET recognizes that itself has approached to the requested area, and starts a positioning session by sending an SUPL POS INIT message to the H-SLP (S96). The SUPL POS INIT message includes at least a session-id and a current area id of the SET. If the SET has not established a circuit switched data connection, it attaches itself to a packet data network, and sends the SUPL POS INIT message to the H-SLP so as to start a positioning session with the V-SLP.

The H-SLP operated as a proxy forwards the received SUPL POS INIT message to the V-SLP that performs a positioning function in an RLP SSRP message (S97).

If a position estimate calculated based on information included in the RLP SSRP message (e.g., a cell-id) satisfies a requested QoP, the V-SLP having received the RLP SSRP message may directly perform step S99 not via step S98. On the contrary, if the calculated position estimate has not met the requested QoP, step S98 is directly performed. In step S98 of FIG. 1, cell-id based positioning methods are not used.

As the SET and the V-SLP exchange successive positioning messages through the H-SLP, the position estimate of the SET is calculated (S98). Preferably, the messages exchanged between the V-SLP and the SET include a session-id, a positioning protocol (RRLP, RRC or TIA-801), etc. The V-SLP calculates the position estimate based on positioning measurements received from the SET (SET-assisted mode), or the SET calculates the position estimate based on assistance data obtained from the V-SLP (SET-based mode). Referring to FIG. 1 showing the SET-assisted mode, the V-SLP sends the calculated position estimate (posresult) to the SET through an SUPL REPORT message via the H-SLP (S99, S100). In case of the SET-based mode, the SUPL REPORT message is not required.

Once the position estimate (posresult) of the SET is received from the V-SLP through the H-SLP, the SET checks if an area event triggered condition has been met, that is, an area event has occurred by comparing the calculated position estimate with position values of the specific area defined in the trigger parameter.

If the calculated position estimate is not consistent with the position values of the specific area defined in the trigger parameter, the SET judges that an area event trigger condition has not been met (i.e., an area event has not occurred) (S101), and proceed to step S102 thus to re-send the SUPL POS INIT message to the V-SLP through the H-SLP (S102, S103). If the area event has not occurred, steps S102 to S107 and steps S108 to S113, etc. may be repeatedly performed. FIG. 1 shows steps S96 to 5107 are repeatedly performed so as to calculate a substantial position estimate of the SET when the positioning session start condition has been met or the area event has not occurred.

However, if the calculated position estimate of the SET is consistent with at least one of the position values for the specific area (i.e., an area event has occurred) (S101), the SET directly performs step S114 not via steps S102 to S113 thus to send the calculated position estimate of the SET to the SUPL Agent on the SET (S114).

If the calculated position estimate of the SET received from the H-SLP through step S112 is consistent with the event area (i.e., if area event has occurred), the SET sends the calculated position estimate of the SET to the SUPL Agent on the SET (S114).

Then, the SET sends the SUPL END message to the H-SLP, and the H-SLP sends the SUPL END message to the V-SLP in an RLP SSRP tunnel message thus to inform that the triggered session has been completed (S115, S116).

Then, the SET and the V-SLP release all resources regarding the positioning session.

As shown in FIG. 1, when the SET-initiates an area event triggered service, the H-SLP obtains area ids regarding the area event triggered session from the V-SLP thus to provide the area ids to the SET. If a positioning session start condition to calculate a substantial position estimate of the SET is met, the SET and the V-SLP establish a positioning session through the H-SLP operated as a proxy, and calculates a substantial position estimate of the SET. If it is judged that an area event has occurred based on the calculated position estimate of the SET, the SET sends an SUPL END message to the H-SLP thus to end the positioning session.

A SET-initiated area event triggered positioning method according to a second embodiment of the present invention will be explained.

Figure 2:
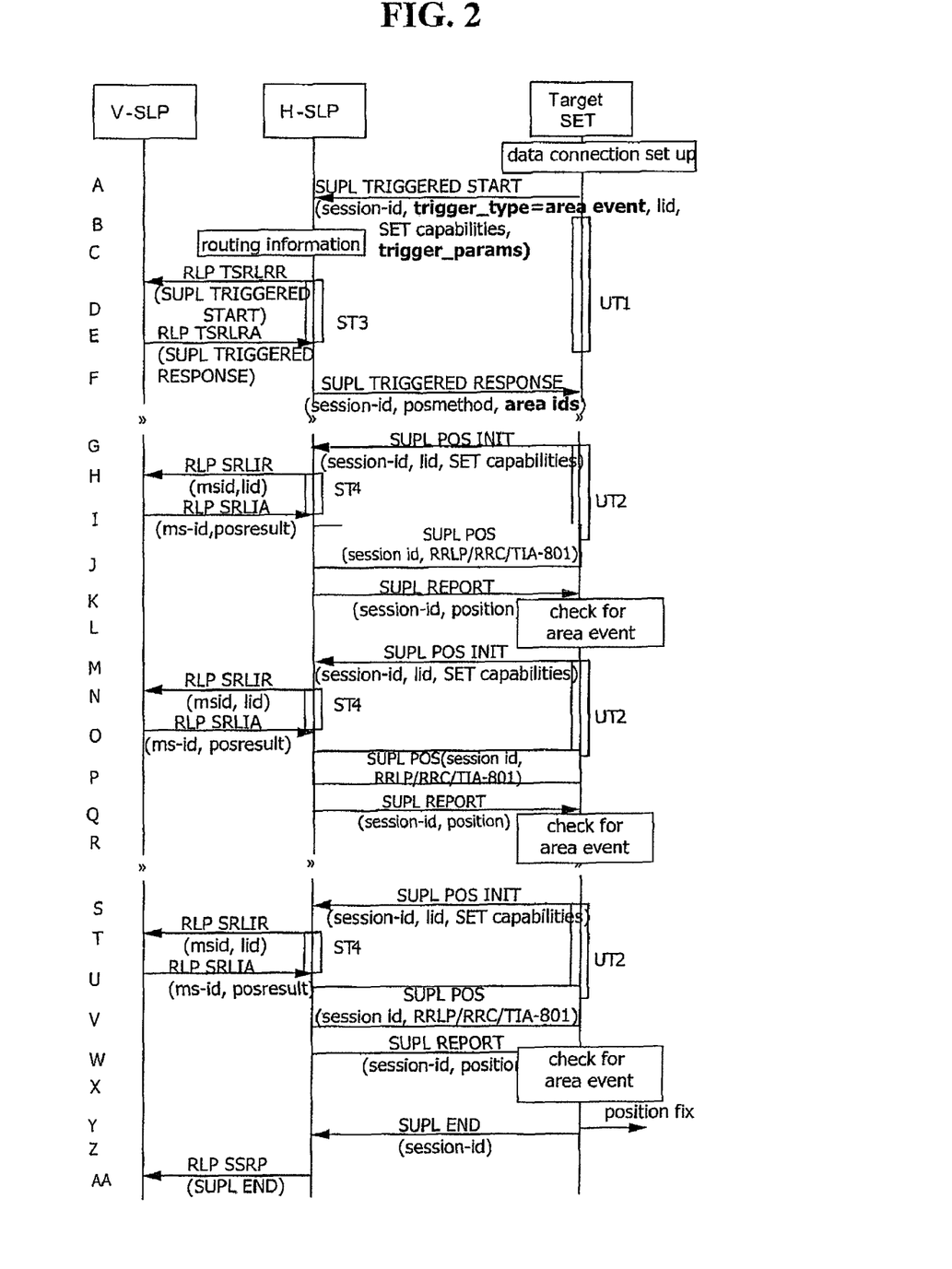
FIG. 2 is a view showing a SET-initiated area event triggered positioning method according to a second embodiment of the present invention.

FIG. 2 is a view showing a SET-initiated area event triggered positioning method according to a second embodiment of the present invention;

As shown in FIG. 2, a roaming case, a SET-initiated case, an H-SLP positioning case and a proxy mode are implemented.

The second embodiment is different from the first embodiment in that a positioning function to calculate a position estimate of the SET is performed by the H-SLP not by the V-SLP.

In order to calculate a substantial position estimate of the SET by satisfying the positioning session start condition (i.e., by verifying a coarse position estimate of the SET), the SET establishes a positioning session with the H-SLP having a positioning function thus to calculate a substantial position estimate of the SET itself.

When the SET that has roamed to the V-SLP initiates its location service, a positioning procedure to calculate a substantial position estimate of the SET may be performed through the V-SLP (the first embodiment), or may be performed through the H-SLP (the second embodiment).

A SET-initiated area event triggered positioning method according to a third embodiment of the present invention will be explained.

Figure 3:
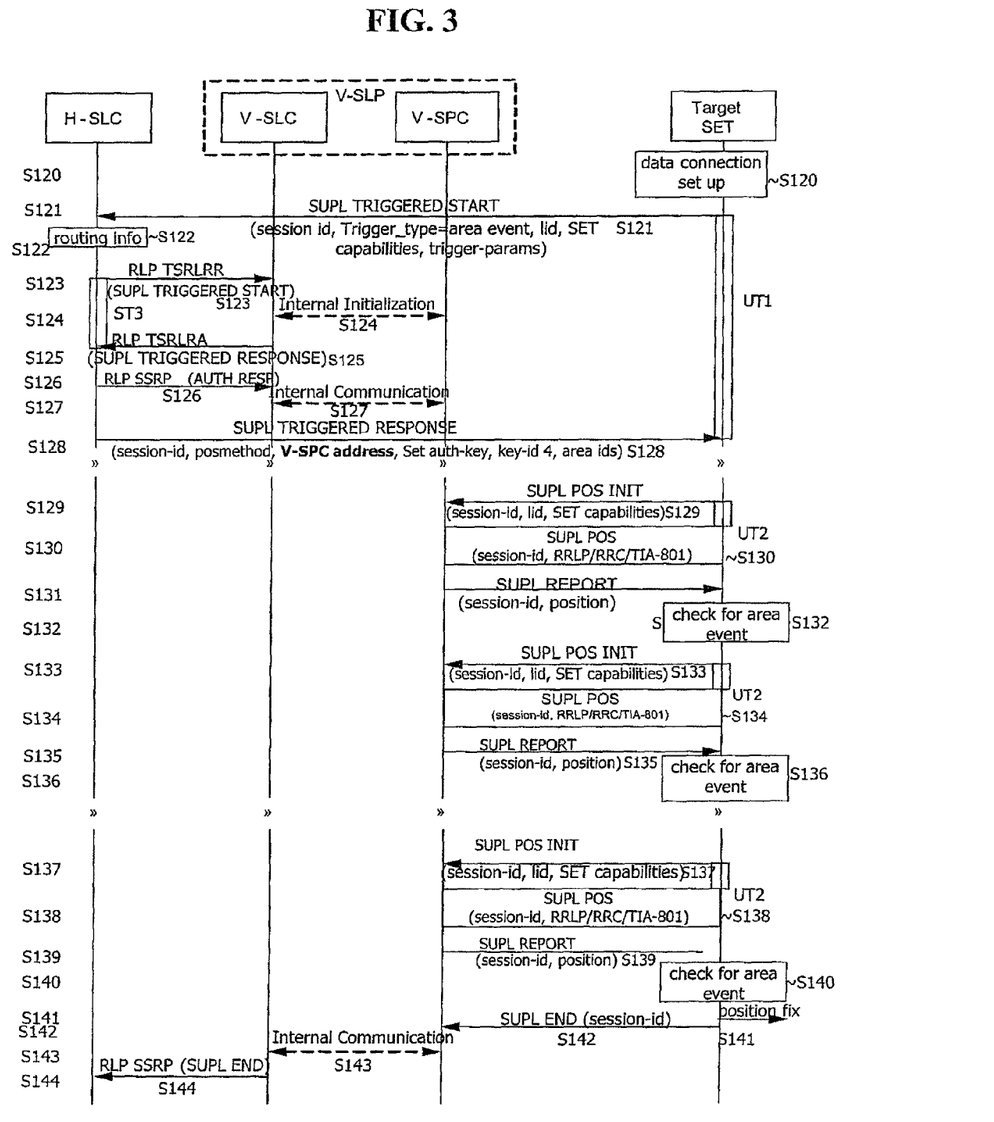
FIG. 3 is a view showing a SET-initiated area event triggered positioning method according to a third embodiment of the present invention.

FIG. 3 is a view showing a SET-initiated area event triggered positioning method according to a third embodiment of the present invention, in which a roaming case, a SET-initiated case, a V-SLP positioning case and a non-proxy mode are implemented. That is, the SET (target SET) is a roaming SET and initiates a location service, the V-SLP performs a positioning function, and the H-SLP uses a non-proxy mode.

The V-SLP includes a V-SLC and a V-SPC, and the H-SLP includes an H-SLC and an H-SPC.

The third embodiment is different from the first embodiment in that a positioning procedure is performed by directly establishing a positioning session between the V-SPC and the SET not via the H-SLC.

The difference between the third embodiment and the first embodiment will be explained in more detail.

Once the SET sends to the H-SLC an SUPL TRIGGERED START message including a session-id, a trigger type indicator (e.g., an area event), a lid, SET capabilities, and trigger parameters (S122), the H-SLC verifies whether the SET is a roaming SET based on routing information (S122). If the SET is a roaming SET, the H-SLC requests and obtains area ids of the specific area defined by the area event triggered session from the V-SLC through the V-SLC (S123 to S127).

The H-SLC sends an SUPL TRIGGERED RESPONSE message to the SET (S128). The SUPL TRIGGERED RESPONSE message includes a session-id, a posmethod, a V-SPC address, area ids, a SET auth-key, and a key-id 4. The V-SPC address indicates an address to be connected by the SET for a positioning session establishment. The SET auth-key and the key-id 4 are parameters to be served for a security session establishment when a direct session is established between the SET and the V-SPC without a proxy server. The SET accesses to the V-SPC address, and recognizes that a security session should be established by using the SET auth-key and the key-id 4.

Once the positioning session start condition is met, the SET sends an SUPL POS INIT message to start a positioning session to the V-SPC. Then, the V-SPC and the SET perform a positioning procedure thus to calculate a substantial position estimate of the SET (S129 to S131).

The SET checks if an area event has occurred by verifying whether the calculated position estimate of the SET meets the area event triggered condition (S132).

If the area event has not occurred, steps S133 to S136 are repeatedly performed.

On the contrary, if the area event has occurred, the SET sends the calculated position estimate to the SUPL Agent on the SET (S141), and sends the SUPL END message to the V-SPC thus to release the triggered session (S142).

As shown in FIG. 3, when the SET-initiates a location service, the H-SLC obtains area ids of a corresponding area regarding an area event triggered session from the V-SPC through the V-SLC, and provides the area ids to the SET. If a positioning session start condition to calculate a substantial position estimate of the SET has been met, the SET and the V-SPC establish a direct positioning session without a proxy server, and a substantial position estimate of the SET is calculated. If it is judged that an area event has occurred based on the calculated position estimate of the SET, the SET sends an SUPL END message thus to end the positioning session.

A SET-initiated area event triggered positioning method according to a fourth embodiment of the present invention will be explained.

Figure 4:
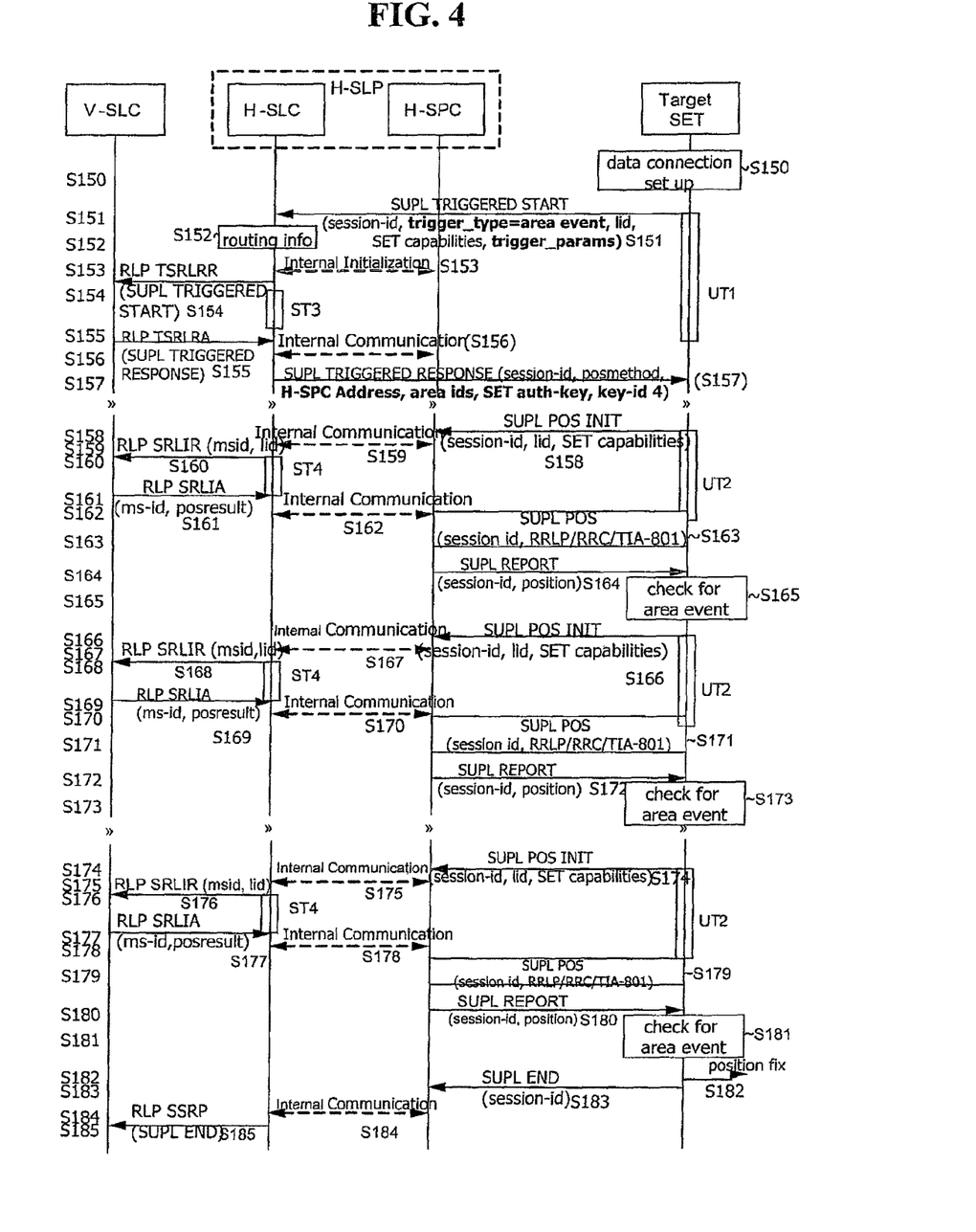
FIG. 4 is a view showing a SET-initiated area event triggered positioning method according to a fourth embodiment of the present invention.

FIG. 4 is a view showing a SET-initiated area event triggered positioning method according to a fourth embodiment of the present invention, in which a roaming case, a SET-initiated case, an H-SLP positioning case and a non-proxy mode are implemented. That is, the SET (target SET) is a roaming SET and initiates a location service, the H-SLP performs a positioning function, and the H-SLP uses a non-proxy mode.

The V-SLP comprises a V-SLC and a V-SPC, the H-SLP comprises an H-SLC and an H-SPC, and the H-SPC performs a positioning function.

The fourth embodiment is different from the first embodiment in that a positioning function to calculate a substantial position estimate of the SET is performed by the H-SLP (in particular, H-SPC), and the H-SLC uses a non-proxy mode.

The difference between the fourth embodiment and the first embodiment will be explained in more detail.

The H-SLC sends an SUPL TRIGGERED RESPONSE message to the SET with including an H-SPC address, a SET auth-key, a key-id 4 parameter, etc. therein (S157).

Since the H-SLC uses a non-proxy mode, the SET auth-key and the key-id 4 parameter are used to establish a security session for a positioning procedure between the H-SPC and the SET. The H-SPC address indicates an address of the H-SPC of which positioning session is to be established by the SET.

If the positioning session start condition has been met, the SET sends the SUPL POS INIT message to the H-SPC (S158). In order to convert a lid included in the SUPL POS INIT message (that is, a current cell id of the SET) into a position estimate, the H-SPC requests the conversion of the lid to the V-SLC via the H-SLC (S159-S160). The V-SLC converts (or translates) the received lid into the position estimate and returns the result to the H-SLC in an RLP SRLIA message (S161). The H-SLC forwards the position estimate of the SET to the H-SPC through internal communication (S162).

The H-SPC checks if the obtained position estimate meets a QoP, and sends an SUPL REPORT message to the SET if so (S164).

However, if the obtained position estimate has not met the QoP, the H-SPC establishes a positioning session with the SET thus to calculate a substantial position estimate of the SET (S163). Once the substantial position estimate of the SET is calculated, the H-SPC sends the SUPL REPORT message to the SET thus to forward the calculated position estimate to the SET (S164).

The SET compares the received calculated position estimate with the position values of the specific area (the event area) defined by the area event triggered condition, thereby checking if an area event has occurred.

As shown in FIG. 4, when the SET (the roaming SET) initiates a location service, the H-SLC obtains area ids of a corresponding area for an area event triggered session from the V-SPC through the V-SLC, and provides the area ids to the SET. If a positioning session start condition to calculate a substantial position estimate of the SET has been met, the SET and the H-SPC establish a direct positioning session without a proxy server, and a substantial position estimate of the SET is calculated. If it is judged that an area event has occurred based on the calculated position estimate of the SET, the SET sends an SUPL END message to the H-SPC thus to end the positioning session.

As aforementioned, in the present invention, since the SET-initiated positioning method based on an SUPL is proposed, SUPL-based positioning methods can be variously implemented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A SUPL (Secure User Plane Location) Enabled Terminal (SET)-initiated area event triggered positioning method in a mobile communication system having a home network and a visited network that support roaming of the SET having a SUPL Agent, the method comprising:

receiving, by a first server of the network, a SUPL TRIGGERED START message from a SET to start a trigger session, the SUPL TRIGGERED START message including a session-id, SET capabilities, a trigger type indicator for indicating an area event, a location identifier (lid), and trigger parameters, wherein the trigger parameters include trigger conditions indicating a change-area type for an area event triggered positioning, and an event area indicating a name or position values of the event area, and wherein the change-area type for an area event triggered positioning indicates entering to the event area, leaving the event area, or staying at the event area;

verifying, by the first server of the network, whether the SET is roaming;

sending, by the first server of the network, a RLP SSRLIR message that includes the SUPL TRIGGERED START message to a second server after the SET is verified to be roaming;

receiving, by the first server, a RLP message from the second server, the RLP message including area ids that represent ids of cells that belong to an area that has been requested to be positioned by the SET;

sending, by the first server, in response to the SUPL TRIGGERED START message, a SUPL TRIGGERED RESPONSE message to the SET, the SUPL TRIGGERED RESPONSE message including a session-id, a positioning method, and the area ids;

receiving, by a third server from the SET, a POS INIT message to allow the SET to start a positioning session with the third server when a comparison of a current area-id and one of the area ids satisfies a positioning session start condition, wherein the POS INIT message includes a session-id, lid, and SET capabilities, wherein the first server and the third server are part of a H-SLP (Home SUPL Location Platform) of the home network;

performing the positioning session by the third server with the SET by exchanging positioning messages to obtain a positioning result;

sending, by the third server to the SET, a SUPL REPORT message that includes the positioning result, whereby the SET then checks whether at least one of the trigger conditions included in the trigger parameters has been satisfied, based on a result of comparing the positioning result with the at least one of the trigger conditions included in the trigger parameters for the area event triggered positioning with respect to the entering, leaving, or staying at the event area indicated by the change-area type; and receiving, by the third server from the SET, a SUPL END message, wherein the first server is a H-SLC (Home SUPL Location Center), the second server is a V-SLC (Visited SUPL Location Center), and the third server is a H-SPC (Home SUPL Positioning Center), and wherein the trigger parameters include the area ids that represent one of ids of cells that belong to mobile country codes (MCC) and primary scrambling code numbers.

2. The method of claim 1, wherein the trigger type indicator is an area event.

3. The method of claim 1, wherein the verifying step is based on routing information.

4. The method of claim 1, wherein the trigger parameters further include the area ids that represent one of ids of cells that belong to an event area, mobile network codes (MNC), and location area codes (LAC).

5. A SUPL (Secure User Plane Location) Enabled Terminal (SET)-initiated area event triggered positioning method in a mobile communication system having a home network and a visited network that support roaming of the SET having a SUPL Agent, the method comprising:

sending, to a first server of the network, a SUPL TRIGGERED START message to start a trigger session, the SUPL TRIGGERED START message including a session-id, SET capabilities, a trigger type indicator for indicating an area event, a location identifier (lid), and trigger parameters, wherein the first server sends a RLP SSRLIR message that includes the SUPL TRIGGERED START message to a second server after the SET is verified to be roaming, and the first server receives a RLP message from the second server, the RLP message including area ids that represent ids of cells that belong to an area that has been requested to be positioned by the SET, wherein the trigger parameters include trigger conditions indicating a change-area type for an area event triggered positioning, and an event area indicating a name or position values of the event area, and wherein the change-area type for an area event triggered positioning indicates entering to the event area, leaving the event area, or staying at the event area;

receiving, from the first server, in response to the SUPL TRIGGERED START message, a SUPL TRIGGERED RESPONSE message, the SUPL TRIGGERED RESPONSE message including a session-id, a positioning method, and area ids that represent ids of cells that belong to an area that has been requested to be positioned by the SET;

sending, to another server, a POS INIT message to allow the SET to start a positioning session with said another server when a comparison of a current area-id and one of the area ids satisfies a positioning session start condition, wherein the POS INIT message includes a session-id, lid, and SET capabilities, wherein the first server and said another server are part of a H-SLP (Home SUPL Location Platform) of the home network;

performing the positioning session with said another server by exchanging positioning messages with said another server to obtain a positioning result;

receiving, from said another server, a SUPL REPORT message that includes the positioning result, whereby the SET then checks whether at least one of the trigger conditions included in the trigger parameters has been satisfied, based on a result of comparing the positioning result with the at least one of the trigger conditions included in the trigger parameters for the area event triggered positioning with respect to the entering, leaving, or staying at the event area indicated by the change-area type; and sending, to said another server, a SUPL END message, wherein the first server is a H-SLC (Home SUPL Location Center), the second server is a V-SLC (Visited SUPL Location Center), and the third server is a H-SPC (Home SUPL Positioning Center), and wherein the trigger parameters include the area ids that represent one of ids of cells that belong to mobile country codes (MCC) and primary scrambling code numbers.

6. The method of claim 5, wherein the calculating of the positioning result is performed by the H-SPC if a SET-assisted mode exists, or is performed by the SET if a SET-based mode exists.

7. The method of claim 1, wherein the trigger type indicator and the trigger parameters included in the SUPL TRIGGERED START message are separate and different parameters from each other.

8. The method of claim 1, wherein the trigger type indicator and the trigger parameters additionally included in the SUPL TRIGGERED START message are separate and different parameters from the session-id, the SET capabilities, and the lid included in the SUPL TRIGGERED START message.

9. The method of claim 5, wherein the trigger type indicator and the trigger parameters included in the SUPL TRIGGERED START message are separate and different parameters from each other.

10. The method of claim 5, wherein the trigger type indicator and the trigger parameters additionally included in the SUPL TRIGGERED START message are separate and different parameters from the session-id, the SET capabilities, and the lid included in the SUPL TRIGGERED START message.

* * * * *